United States Patent [19]

Tanaka

[11] Patent Number: 5,274,647
[45] Date of Patent: Dec. 28, 1993

[54] ELASTIC BUFFER WITH ERROR DETECTION USING A HAMMING DISTANCE CIRCUIT

[75] Inventor: Koichi Tanaka, Kawasaki, Japan

[73] Assignee: Kabushiki Kaisha Toshiba, Kawasaki, Japan

[21] Appl. No.: 884,885

[22] Filed: May 18, 1992

Related U.S. Application Data

[63] Continuation of Ser. No. 476,581, Feb. 7, 1990, abandoned.

[30] Foreign Application Priority Data

Feb. 13, 1989 [JP] Japan .................. 1-031018

[51] Int. Cl.$^5$ .......................................... H03M 13/00
[52] U.S. Cl. ..................... 371/48; 371/40.1; 371/57.1; 371/60
[58] Field of Search ............... 371/48, 57.1, 55, 40.1, 371/51.1, 60; 364/239.1; 370/84

[56] References Cited

U.S. PATENT DOCUMENTS

| | | | |
|---|---|---|---|
| 3,940,736 | 2/1976 | Inaba et al. | 371/48 |
| 4,056,851 | 11/1977 | Hovagimyan et al. | 364/900 |
| 4,095,283 | 6/1978 | Campbell | 365/230 |
| 4,175,287 | 11/1979 | Fuhrman | 364/900 |
| 4,181,975 | 1/1980 | Jenkins | 364/900 |
| 4,195,351 | 3/1980 | Barner et al. | 364/900 |
| 4,556,960 | 12/1985 | Cohn et al. | 364/900 |
| 4,692,894 | 9/1987 | Bemis | 364/900 |
| 4,750,181 | 6/1988 | McDonald et al. | 371/71 |
| 4,860,293 | 8/1989 | Engel et al. | 371/51.1 |
| 4,912,710 | 3/1990 | Rolfe | 371/71 |
| 4,937,814 | 6/1990 | Weldink | 370/60 |
| 4,964,142 | 10/1990 | Annamalai | 375/118 |
| 4,996,698 | 2/1991 | Nelson | 375/118 |

FOREIGN PATENT DOCUMENTS

0217486 4/1987 European Pat. Off. .

Primary Examiner—Robert W. Beausoliel, Jr.
Assistant Examiner—Ly V. Hua
Attorney, Agent, or Firm—Foley & Lardner

[57] ABSTRACT

An elastic buffer circuit uses codes having a predetermined number of bits and a Hamming distance of 1 when adjacent memory elements are designated. The codes contain a common code in which bits other than, one bit of the code each adjacent memory element are the same. The elastic buffer includes a plurality of memory elements for storing data and then outputting the data. A writing designation means generates writing position coded for successively designating the memory element in cycles when data is stored in the memory element in synchronism with a first clock pulse using the code. A reading designation means generates a reading position code for successively designating the memory element in cycles using the codes when data is read out from the memory element in synchronism with a second clock pulse. An error detection circuit detects an occurrence of an over-flow error or an under-flow error when the common code of the memory element designated by the reading position code is the same as the common code of the memory element designated by the writing position code.

5 Claims, 8 Drawing Sheets

| MEMORY ELEMENT# | POSITION CODE | ERROR DETECTION CODE, END POSITION DETECTION CODE | WRITING INITIAL CODE |
|---|---|---|---|
| 0 | 0 0 0 0 | 0 0 0 × | 1 0 1 0 |
| 1 | 0 0 0 1 | | 1 0 1 1 |
| | | 0 0 × 1 | |
| 2 | 0 0 1 1 | | 1 0 0 1 |
| | | 0 0 1 × | |
| 3 | 0 0 1 0 | | 1 0 0 0 |
| | | 0 × 1 0 | |
| 4 | 0 1 1 0 | | 1 1 0 0 |
| | | × 1 1 0 | |
| 5 | 1 1 1 0 | | 0 1 0 0 |
| | | 1 × 1 0 | |
| 6 | 1 0 1 0 | | 0 0 0 0 |
| | | 1 0 1 × | |
| 7 | 1 0 1 1 | | 0 0 0 1 |
| | | 1 0 × 1 | |
| 8 | 1 0 0 1 | | 0 0 1 1 |
| | | 1 0 0 × | |
| 9 | 1 0 0 0 | | 0 0 1 0 |
| | | 1 × 0 0 | |
| 10 | 1 1 0 0 | | 0 1 1 0 |
| | | × 1 0 0 | |
| 11 | 0 1 0 0 | | 1 1 1 0 |
| | | 0 × 0 0 | |
| 0 | 0 0 0 0 | | 1 0 1 0 |

X : OPTIONAL

ELASTIC BUFFER WITH ERROR DETECTION USING A HAMMING DISTANCE CIRCUIT

This application is a continuation of application Ser. No. 07/476,581, filed Feb. 7, 1990, now abandoned.

BACKGROUND OF THE INVENTION

1. Field of the Invention

The present invention relates to an elastic buffer circuit for delaying communication data input thereto and then outputting this data, and particularly to an elastic buffer circuit for operating in synchronism with an input clock pulse and an output clock pulse having almost the same frequencies, each including a frequency variation therein.

2. Description of the Prior Art

Figure 1:
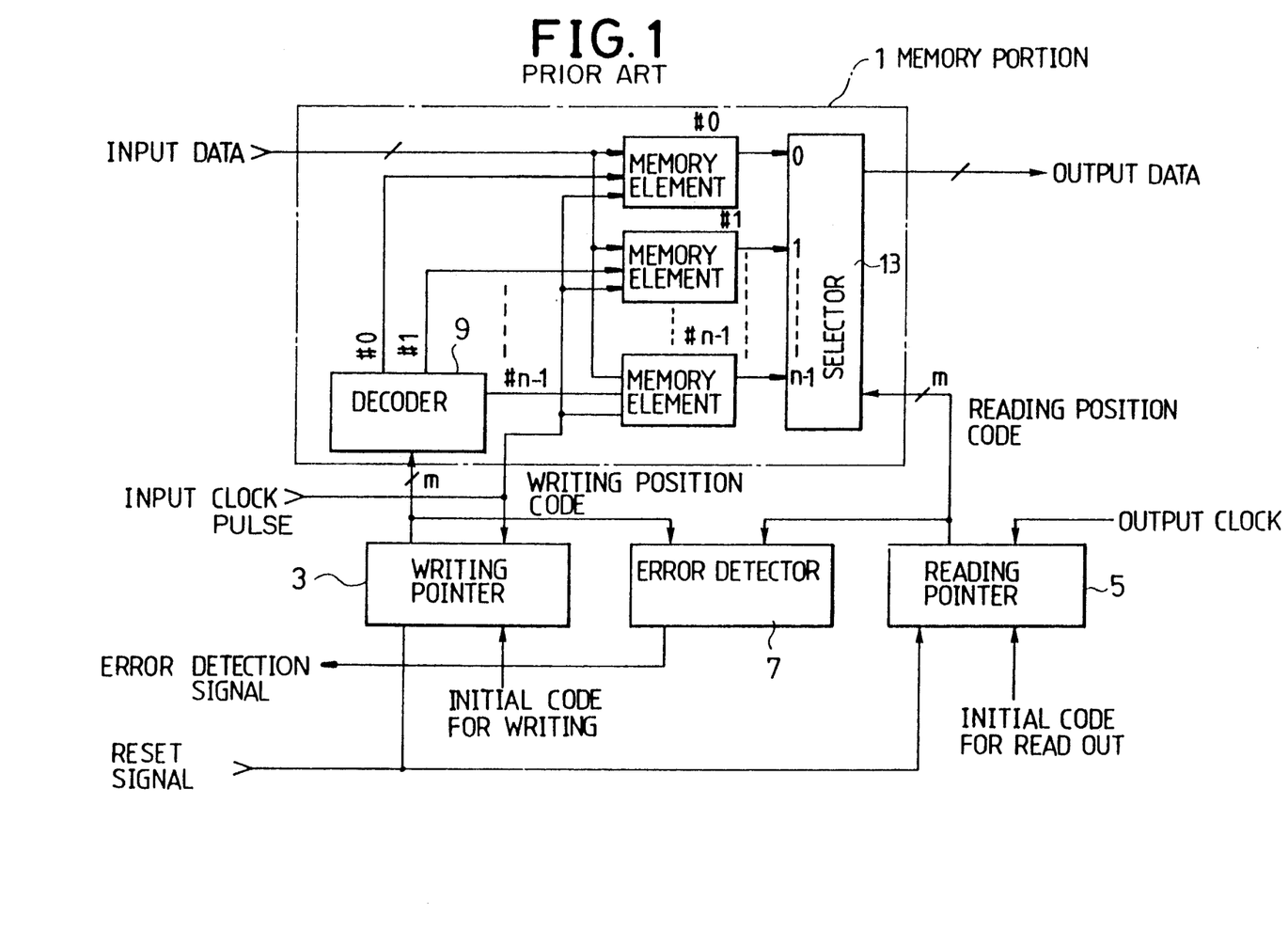
FIG. 1 is a configuration diagram of a conventional elastic buffer circuit.

In digital communication devices, for example, a configuration as shown in FIG. 1 is known as an elastic buffer circuit to be inserted in an input and output path to delay communication data.

In this diagram, a delay buffer circuit as the elastic buffer has a memory portion 1 for storing input data and then outputting the data, a writing pointer 3 for controlling the writing of the data input to the memory portion 1, a reading pointer 5 for controlling the reading of the data output from the memory portion 1 and an error detector 7 for detecting an error generated in the writing and reading operation.

In the memory portion 1, data to be input thereto is successively contained in memory elements selected from n memory elements (a position #0 to a position #n−1) by a decoder 9. The data contained in the memory elements is selected by a selector 13, and then output as output data.

Namely, binary numbers of 0 to n−1 designating memory elements (where the binary number is a number of m figures (n < =$2^M$), hereinafter called a "writing position code") is output from the writing pointer 3 in synchronism with an input clock. Then, each writing position code is decoded by the decoder 9. Thereafter the input data is successively stored in the memory elements based on each decoded result.

Binary numbers of 0 to n−1 designating memory elements (the binary number will be called a "reading position code" hereinafter) is output from the pointer 5. Then, data stored in the respective memory elements is selected and output based on the respective reading position codes by the selector 13.

Figure 2:
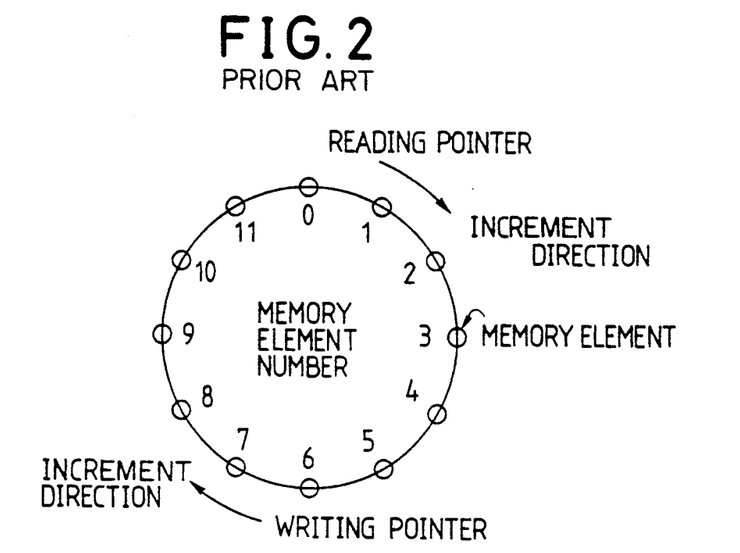
FIG. 2 is a diagram showing the relation between a reading pointer and a writing pointer of the elastic buffer circuit shown in FIG. 1.

In the operation for delayed input data, when the operation is starting, a code having an interval of n/2 with respect to an initial code of the reading pointer 5 is set as a writing initial code designated by the writing pointer 3, where n is the number of memory elements. For example, assuming that the number of memory elements is 12 (n=12), when the input data is successively stored in the memory elements from the memory element designated by a position #0 based on the writing position codes, the output data is successively read out of the memory elements from the element designated by a position #6 based on the reading position codes. In such a manner, an attempt is made to cause a frequency variation of the input clock pulse with respect to the output clock pulse to be absorbed by setting a sufficiently large interval between the reading position code and the writing position code.

However, in the elastic buffer circuit comprising the above-mentioned configuration, the frequency variations of the input clock and output clock pulses cause errors such as underflow, in which the number of data units to be stored in the memory elements becomes less than 0, and overflow, in which the number of data units becomes greater than n.

Figure 3:
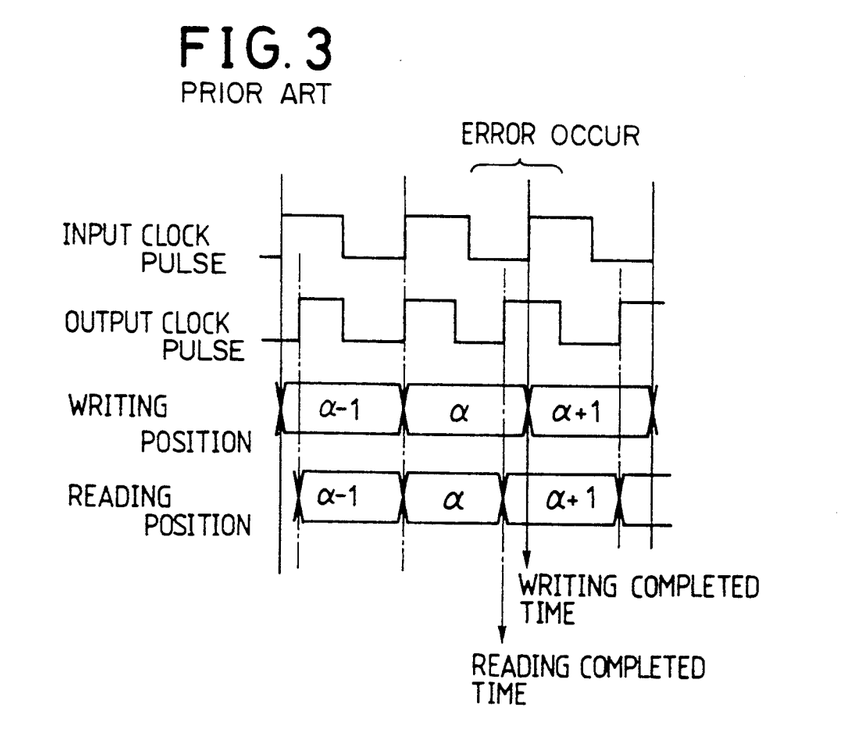
FIGS. 3, 4 and 5 are timing charts showing error operations occurring in the elastic buffer circuit of FIG. 1.
Figure 4:
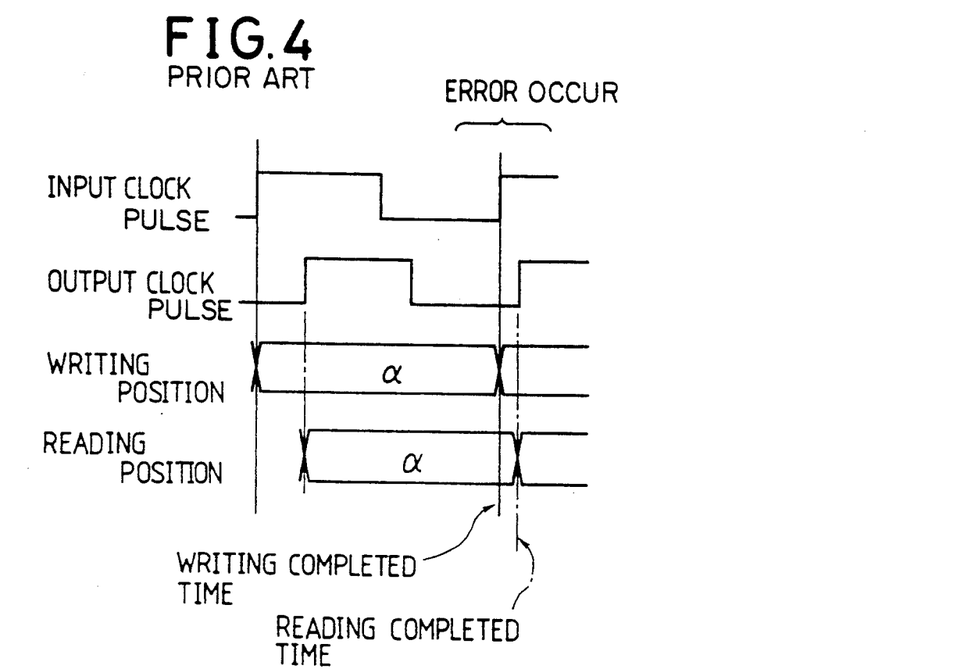

For example, in the case of a frequency variation in which the frequency of the input clock pulse is a little lower than that of the output clock pulse, the number of data units to be stored is gradually reduced and finally becomes less than 0. At that time, when the writing pointer 3 and the reading pointer 5 designate the same memory element, as shown in FIG. 3, since the frequency of the output clock pulse is high, an underflow error in which data is read before completion of the writing of the data into the memory elements is caused. Otherwise, the reading is carried out immediately after the completion of the writing as shown in FIG. 4, so that it becomes difficult to stably output the data.

Figure 5:
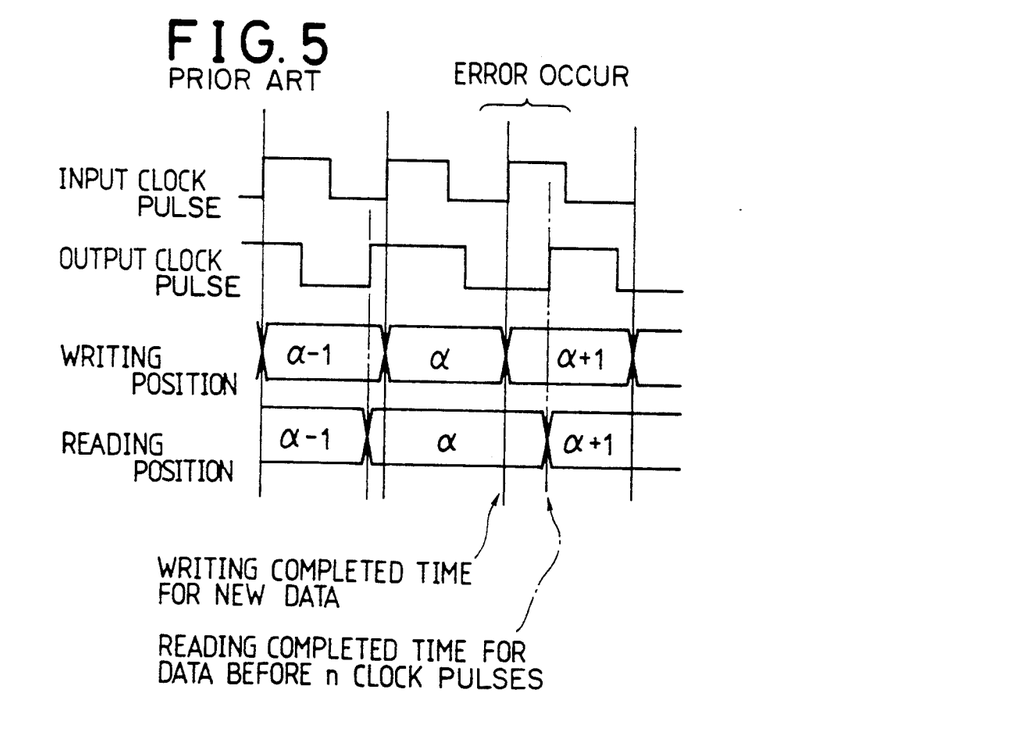

Also, in the case of a frequency variation in which the frequency of the input clock pulse is a little higher than that of the output clock pulse, the number of data units to be stored is gradually increased and finally becomes greater than n. At that time, when the writing pointer 3 and the reading pointer 5 designate the same memory element, as shown in FIG. 5, an overflow error in which the next data is written in the same memory element before completion of the reading of the data occurs.

Such errors are detected by the error detector 7. When the error detector 7 detects an error, it outputs an error detection signal on condition that either the equation $$K = L(K - L = 0)$$

when an overflow error is caused, or $$K = L - 1(K - L = 1)$$

when an underflow error is caused is satisfied.

Where K is the position of the memory element designated by the writing pointer 3, and L is the position of the memory element designated by the reading pointer 5.

When a frequency variation occurs in the input clock pulse or in the output clock pulse, an error operation such as those mentioned above is likely to be caused. Accordingly, when the error occurs, the writing and the reading should be temporarily stopped, and the writing position code and the reading position code reinitialized and returned to normal operation.

As stated above, the error operation is detected by the difference between the values of the writing position code and the reading position code respectively cycling from 0 to n−1 and judging whether the difference is 0 or 1. Thus, a complex configuration is required for the circuits for calculating the difference in the codes respectively cycling from 0 to n−1.

Moreover, the writing position code and the reading position code are respectively composed of a plurality of bits so that the difference between the codes is also composed of a plurality of bits. Accordingly, the values of the bits for designating the difference are not stably fixed until the input and the output operations of the data are completed and the respective position codes are fixed. The error detection signal is output at that time. However, since the input and output operations are carried out at different times respectively based on the input clock pulse and the output clock pulse, including frequency variations, it is extremely difficult to obtain timings for stably fixing the difference of the respective position codes. Therefore, it is difficult to distinctly judge whether the difference of the respective position codes is 0 or 1, thus an occurrence of the error operation can not be detected correctly in the prior art.

In the initialization of the pointing means, the writing position code and the reading position code, as described above, the writing pointer having the writing position code and the reading pointer having the reading position code should be suitably set out not only at the start of the operation, but also after detection of the error operation and when normalizing the delay time. However, since the number of data units in memory elements is not fixed because of frequency variation, it is extremely difficult to initialize the distance of both position codes without losing valid data. For example, when the number of the valid data units is more than n/2 and the distance of both the positions is set at n/2, a portion of the valid data is inevitably lost.

Moreover, when the initialization is carried out during the operation of the elastic buffer circuit, in order to set a code obtained by addition of n/2 to a reading code of the reading pointer 5 as an initial writing value of the writing pointer 3, an additional circuit for calculating the above code is required, so that the size of the elastic buffer circuit must be increased.

Incidentally, the additional operation for calculating the code must change values of a plurality of bits in the code, and each value of the bits can not be fixed at the same time. Furthermore, since the calculation to decide the timing of the initialization can not be carried out in synchronism with the input clock pulse, the initial code can not be set as a correct writing initial code. In this case, normal operation cannot be obtained even when the pointing means are initialized.

SUMMARY OF THE INVENTION

The present invention has been invented in the light of the above problems, and an object thereof is to provide a elastic buffer circuit which can perform not only stable error detection with a simple circuit configuration but also reliably correct initialization.

To achieve the above object, an elastic buffer, as a preferred embodiment according to the present invention, uses a code consisting of predetermined bits and having a Hamming distance of 1 when adjacent memory means are designated and uses a common code in which the bits other than one bit of the code of each adjacent memory means are same. The elastic buffer includes:

a plurality of memory means for storing data and then outputting the data;

writing designation means using the code for successively designating the memory means in cycles when data is stored in the memory means in synchronism with a first clock pulse;

reading designation means using the code for successively designating the memory means in cycles when data is read out from the memory means in synchronism with a second clock pulse; and error detection means for detecting an occurrence of an error when the common code of the memory means designated by the reading designation means is the same as the common code of the memory means designated by the writing designation means.

Accordingly, by using the codes and the common codes described above, an occurrence of an error operation can be easily and rapidly detected when the common code of the memory means designated by the writing designation means is the same as the common code of the memory means designated by the reading designation means, because the common code is the code having only bits which are not changed in synchronism with the input clock pulse.

In addition to the configuration of the elastic buffer described above, an elastic buffer as another preferred embodiment of the present invention, further includes initialization means for storing the code designating the memory means storing the data when an end signal is provided, and then for initializing the content of the writing designation means when the code designating the memory means and the code designated by the reading designation means are the same common code; and initial code setting means for setting an initial code into the writing designation means. The initial code is obtained as the result of a logical calculation operation between the code designated by the reading designation means and a predetermined code.

As stated above, the elastic buffer circuit can have a simple circuit configuration and can guarantee stable and correct error detection since the codes and the common codes as the error detection codes designating the memory elements are used, and the code has the Hamming distance of 1.

Moreover, since the initialization is carried out after the valid data contained in the memory means is read out, the positions of the memory means in which the valid data is written are stored in the initialization means, and the initial code is set based on the code for designating reading, so that the most suitable initialization of the writing designation means can be reliably carried out.

These and other objects, features and advantages of the present invention will be more apparent from the following description of a preferred embodiment, taken in conjunction with the accompanying drawings.

DETAILED DESCRIPTION OF THE EMBODIMENT

Embodiments of the present invention will now be described with respect to the drawings.

Figure 6:
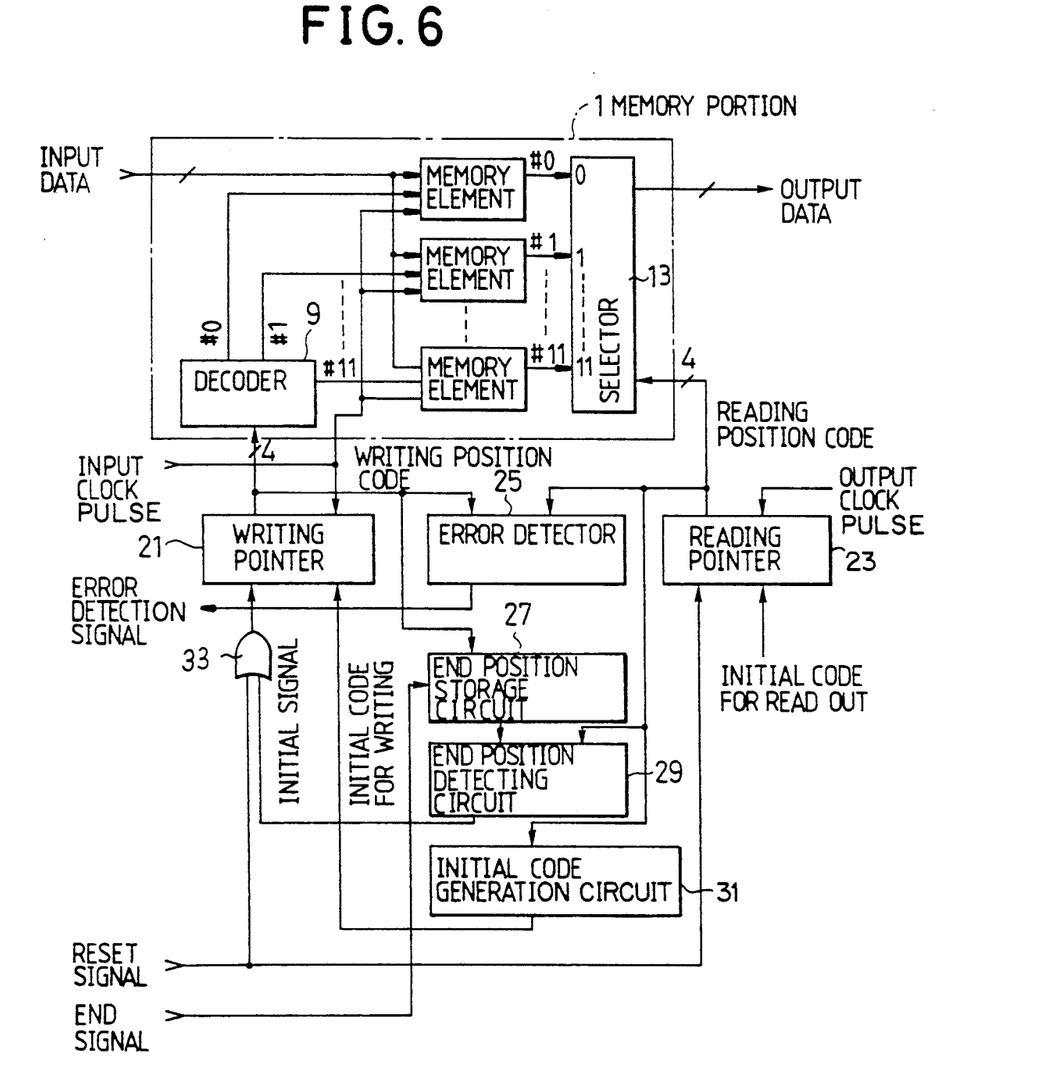
FIG. 6 is a configuration diagram of an elastic buffer circuit as an embodiment of the present invention.

FIG. 6 is a block diagram showing the configuration of an elastic buffer circuit as an embodiment of the present invention. The elastic buffer circuit has 12 memory elements as memory means. Incidentally, in FIG. 6, each function designated by the same reference numeral or character presents the same function as in FIG. 1, thus explanation thereon will be omitted. Besides the memory portion 1 shown in FIG. 1, the elastic buffer circuit of the present invention comprises a writing pointer 21 as a writing designation means, a reading pointer 23 as a reading designation means, an error detector 25 as an error detection means, an end position storage circuit 27, an end position detecting circuit 29 and an initial code generation circuit 31.

The decoder 9 designates a memory element to store an input data by receiving the writing position codes transferred from the writing pointer 21. The writing pointer 21 is counted up in synchronism with the rise of an input clock pulse as a first clock pulse. Thus, the counted-up writing position code designates the memory element for storing the next input data. With respect to the position code, the Hamming distance of each code for selecting adjacent memory elements is set at 1.

Figure 7:
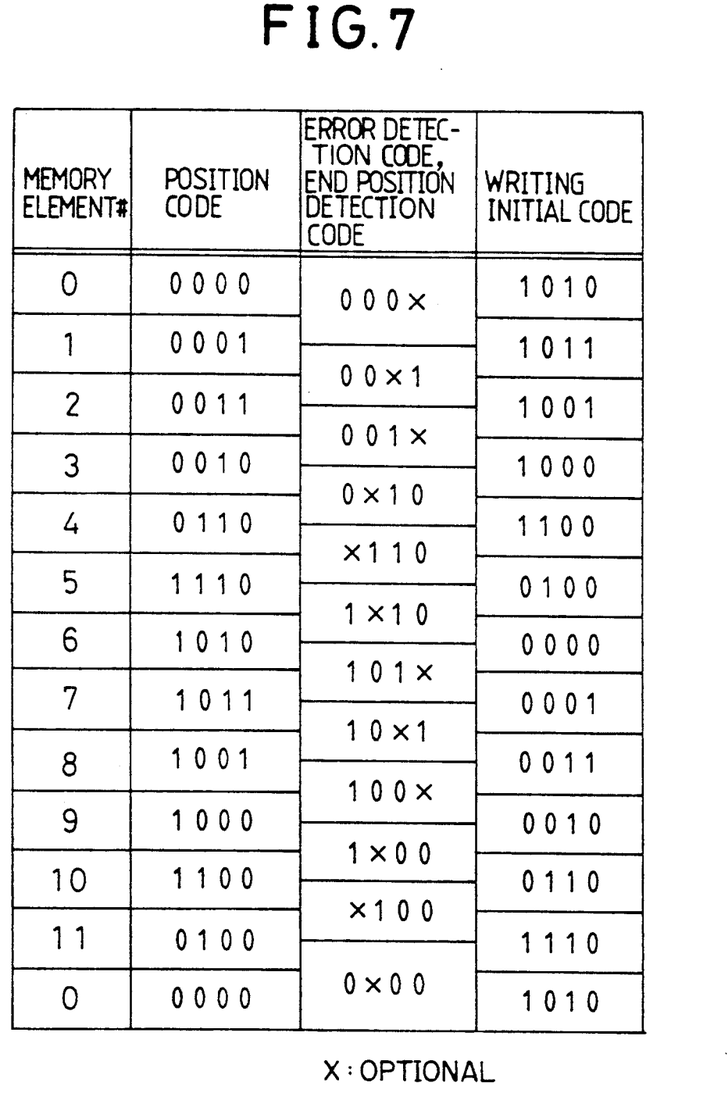
FIG. 7 is a diagram showing position codes to be used in the elastic buffer circuit shown in FIG. 6.

FIG. 7 is a diagram showing position codes to be used in the embodiment. With respect to these writing position codes, a pair of codes is selected, as the interval between the pair of codes being a half of the number of the memory elements. An exclusive OR of each pair of codes is set to be always a predetermined value that is 1010 in the embodiment.

When a reset signal such as a command for starting the operation or an initializing signal to be generated by an end position detecting circuit 29, is given to an OR gate 33, a writing initial code as shown in FIG. 7 is given and set in the writing pointer 21 from the initial code generation circuit 31 in accordance with a present value of the reading pointer 23.

The reading pointer 23 performs a count-up output of the reading position code in synchronism with the rise of an output clock pulse as a second clock pulse. Memory elements storing data are designated by a selector 13 by decoding the reading position code. At the time, the reading position code is set in the same manner as the writing position code. When the reset signal is given from an external circuit (not shown), a reading initial code, for example 0000, is set in the reading pointer 23.

The error detector 25 detects overflow or underflow, and outputs an error detection signal in synchronism with the input clock pulse when the position of a memory element designated by the writing pointer 21 is the same position as a memory element designated by the reading pointer 23 or when the difference between these two positions is 1.

Since each Hamming distance for both codes of the adjacent memory elements is 1, whether each of the above conditions is established or not can be judged by a 3 bit code (hereinafter the 3 bit-code is referred to as "as error detection code"). The 3 bit code is defined as a common code. The common code consists of the 3-bits excepting one bit in the 4 bit error detection code and the 4 bit end position detection code.

Such an error detection code is set to correspond to each adjacent pair of position codes as shown in FIG. 7. In FIG. 7, the mark X ln the error detection code and the end position detection code is the optional bit other than 3 bits in the code.

For example, in the case where the writing pointer 21 designates a memory element position #0, an error operation is generated when the reading pointer 23 designates the memory element position #0 or the memory element position #1, and the error detection code at the time is 000X. Accordingly, in such a case, the error detector 25 detects whether the first 3 bits of the reading position code are 000 or not.

The error detector 25 generates an error check signal for each error detection code corresponding to each writing position code. Each error check signal asserts a high-level state when the reading position code becomes the same as the error detection code.

Figure 8:
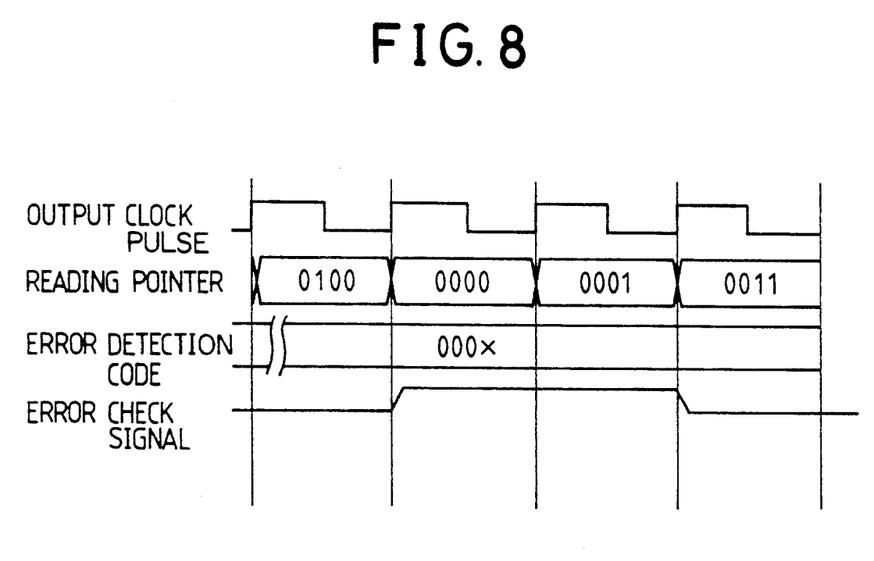
FIGS. 8, 9 and 10 are timing charts showing operation of the elastic buffer circuit of FIG. 6.

For example, an error check signal corresponding to the error detection code 000X asserts a high-level state when a reading position code output from the reading pointer 23 is 0000 or 0001 as shown in FIG. 8. The error detector 25 selects such a plurality of error check signals in accordance with the writing position codes. Then, the detector 25 outputs the selected error check signals as error detection signals in synchronism with the input clock pulse.

The end position storage circuit 27 contains position codes to indicate memory elements in which final valid data is stored when the elastic buffer circuit is reinitialized. Namely, when a final signal is given from an external circuit (not shown) at the reinitialization, the end position storage circuit 27 stores a writing position code output from the writing pointer 21. The codes stored in the end position storage circuit 27 is output to the end position detecting circuit 29. The circuit 29 is able to generate timing of the reinitialization after the final valid data is read. The circuit 29 outputs an initialization signal to the OR gate 33 when the position of a memory element designated by the reading pointer 23 is the same position as a memory element in which the final valid data is stored, or when the difference between the two positions is 1.

Such an operation is carried out by using the same code as an error detection code, as shown in FIG. 7, for the end detection code. Namely, the end position detecting circuit 29 detects when the 3 bits are the same or different of the 3 bits in both the end detection codes corresponding to the code contained in the end position storage circuit 27 and the reading position code output by the reading pointer 23, then outputs the initialization signal.

The initial code generation circuit 31 sets a writing initial code in the writing pointer 21 corresponding to the present value of the reading pointer 23 when the reset signal or the initialization signal is output. The writing initial code in the embodiment is a code corresponding to a memory element designated by a sixth position (i.e. +6) from the position of a memory element designated by the reading pointer. The initial code generation circuit 31 generates an initial code by an exclusive OR between a position code designated by the reading pointer 23 and the above-mentioned predetermined code (1010) for provision of the position code.

Next, operation of the embodiment will be described in consideration of the initialization operation and error detection operation thereof.

First, the reset signal is given to the reading pointer 23 before operation of the elastic buffer circuits is started, thereby setting 0000 as the reading initial code in the reading pointer 23. The reading initial code is also given to the initial code generation circuit 31, and an exclusive OR of the code and the predetermined code 1010 is obtained. Namely, the operational result of the exclusive OR designates a memory element position #6 designated by a code 1010 which is the sixth position from the memory element position #0 designated by the reading position code 0000.

The code 1010 is set as a writing initial code writing initial pointer 21. Accordingly, the interval of both the memory elements designated by the reading pointer 23 and the writing pointer 21 respectively becomes 8, as clearly shown in FIG. 7.

When an input clock pulse is applied to the writing pointer 21, input data is stored in the memory element corresponding to the writing position code in synchronism with the input clock pulse and the writing position code are counted up for next input data. Moreover, when an output clock pulse is applied to the reading pointer 23, data contained in the memory element corresponding to the reading position code is output in synchronism with the output clock pulse through the selector 13. The reading position code is counted up for the next output data.

In such a manner, input data is successively stored in memory elements, then the stored data is delayed and output in the same order as received.

In such operation for the elastic buffer circuit, when frequency variation is generated in the input clock pulse or output clock pulse, the difference between a position of a memory element designated by the writing pointer 21 and a position of a memory element designated by the reading pointer 23 becomes small, and the two positions approach each other. When the difference is 1 or 0, an error check signal corresponding to the writing position code is selected. The error check signal is output as an error detection signal in synchronism with the input clock pulse. Thus, the error detection is completed.

Figure 9:
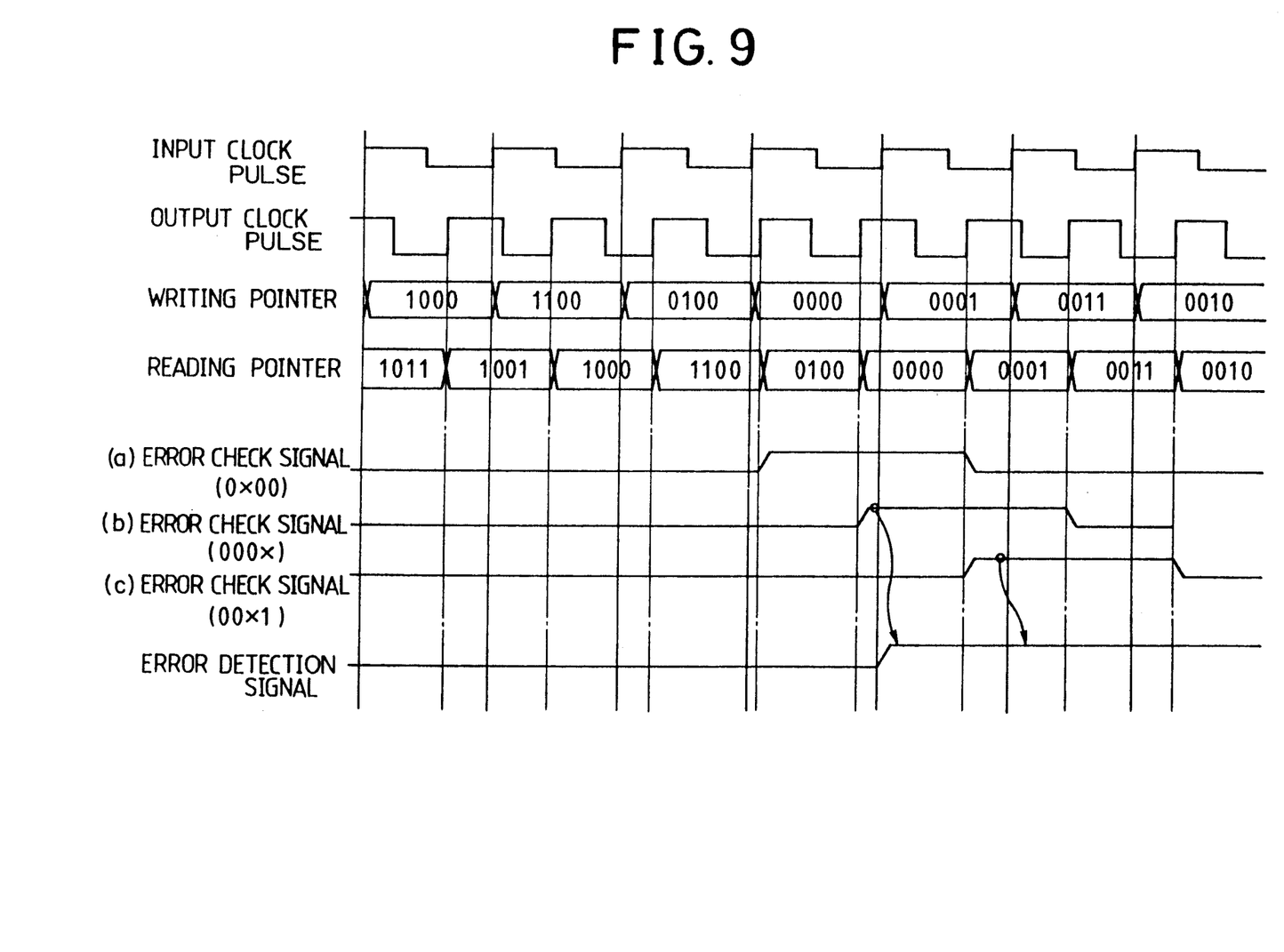

For example, when the writing position code output from the writing pointer 21 and the reading position code output from the reading pointer 23 vary as shown in FIG. 9, the timing charts for the error check signals (a), (b) and (c) respectively corresponding to error detection codes 0X00, 000X and 00X1 become as shown in FIG. 9. Of these error check signals, the error check signals (b) and (c) are selected according to the writing position code output from the writing pointer 21, (because an error detection signal according to the writing position code "0000" is "000X" and an error detection signal according to the writing position code "0001" is "00X1"), thus an error detection signal as shown in FIG. 9 is output.

Since, an error is detected by selection of the error check signal using the position code in which only one bit is varied, no hazard is caused in the operation for error detection. Accordingly, the delay buffer circuit disclosed in the embodiment can stably and reliably detect errors, though the errors cannot be judged until the operational results of a plurality of bits become stable in the conventional delay buffer circuit.

Next, when a final signal is applied to the end position storage circuit 27 during the operation, it contains a writing position code for designating a memory element in which final valid data is contained. Then, a writing initial code is output when a position designated by the reading position code is the same as a position designated by the code contained in the end position storage circuit 27 or when the difference in these positions is 1, then initialization is completed.

Figure 10:
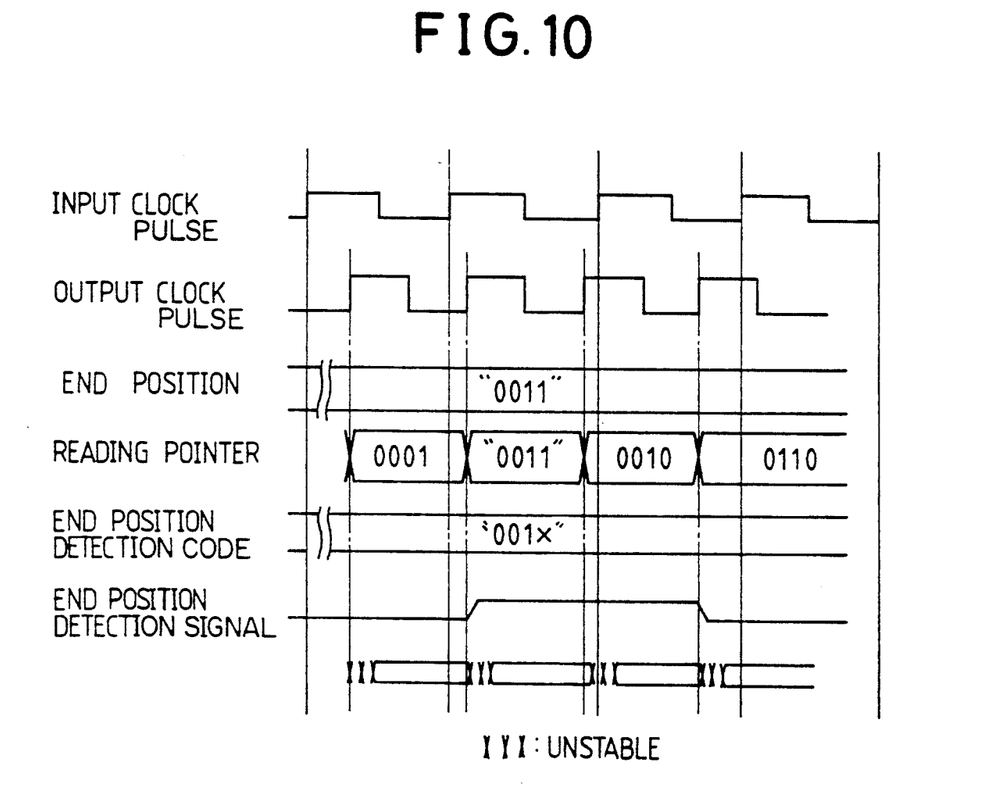

For example, when a writing position code of 0011 is stored in the end position storage circuit 27 as shown in FIG. 10, a suitable end position detection code is 001X which corresponds to this code or a following code. Accordingly, when the reading position codes are 0011 or 0010, an end position detection signal is output as shown in FIG. 10. Thus, an initial signal is given to the OR gate 33 from the end position detecting circuit 29, and like the reset operation, an exclusive OR between the reading initial code and the predetermined code 1010 is calculated, then the result is stored in the writing pointer 21. The result designates the sixth code from the reading pointer 23.

As stated above, since the reset operation is also judged by using a variation of 1 bit in the reading position code in addition to judgment of error detection, there is no danger of error in the reset timing. Thus, the reset operation can be performed at a stable and most suitable timing on the output of data without considering the number of data units contained before reset.

A reading position code is sent to the initial code generation circuit 31 when a reset signal is sent to the reading pointer 23. Then, the exclusive OR of the code sent to the initial code generation circuit 31 and the predetermined code 1010 is taken. The result of the operation is then set as a writing initial code in the writing pointer 21. At that time, even in the case where the initial code is set in the writing pointer 21 as soon as a reading position code output from the reading pointer 23 varies, the variation of the reading position code is only 1 bit. Therefore, the variation of the initial code is also 1 bit, and a position which is next to the target position is reliably set. Accordingly, even when the reinitialized operation is carried out, a most suitable writing initial code can be obtained as compared with the conventional case.

As a result, the reset operation can be performed at the most suitable timing irrespective of variations in the number of data items to be stored and the frequencies of the input clock and output clock pulses, and further operation for input and output after the reset operation can be started from the most suitable position.

Incidentally, the present invention is not limited to the above embodiment. For example, any code rows of the position code other than that in FIG. 7 may be taken to obtain a similar effect, provided the Hamming distance between each adjacent pair thereof is 1.

Also, the number of memory elements is not limited as described in the embodiment, and suitable position codes may be selected for variation of the number. Moreover, the predetermined code for the exclusive OR between the reading position code when the writing initial code is obtained is not limited to 1010 as in the embodiment.

Furthermore, in the embodiment, the judgment of the reset timing is carried out when the end position is in accordance with the reading position. However, the reset may be carried out when the reading position reaches a position at a predetermined interval from the end position.

Various modifications will become possible for those skilled in the art after receiving the teachings of the present disclosure without departing from the scope thereof.

What is claimed is:
1. An elastic buffer circuit comprising:
 a plurality of memory elements for storing and outputting data;
 writing designation means for successively designating memory elements to store input data in synchronism with a first clock pulse said writing designation means designating adjacent memory elements by memory position codes having a predetermined number of bits and a Hamming distance of 1, the memory position codes including common codes in which all the bits other than one bit of the writing position codes of adjacent memory elements are same;

reading designation means for successively designating memory elements for reading of output data in synchronism with a second clock pulse, said reading designation means designating adjacent memory elements by reading position codes having a predetermined number of bits and a Hamming distance of 1, the reading position codes further including common codes in which all the bits other than one bit of the reading position codes of adjacent memory elements are the same;

means for detecting as errors occurrences when the common code of a memory position code of a memory element designated by the reading designation means is the same as the common code of a memory position code of a memory element designated by the writing designation means;

initialization means for storing the writing position code designating the memory element storing data when an end signal is provided, and for initializing the contents of the writing designation means when the stored writing position code and the code designated by the reading designation means have the same common code; and initial code setting means for setting into the writing designation means an initial code, obtained as a result of a logical operation between a code designated by the reading designation means and a predetermined code.

2. An elastic buffer circuit as recited in claim 1, wherein the first and the second clock pulses have different frequencies.

3. An elastic buffer circuit as recited in claim 1, wherein the memory element position designated by the writing designation means based on said result of said logical operation in said initial code setting means is separated by the nearest one half of the number of memory elements from the memory element position designated by the reading designation means.

4. An elastic buffer circuit as recited in claim 1, wherein said first and second clock pulses are asynchronous.

5. An elastic buffer circuit as recited in claim 1, wherein said first and second clock pulses exhibit asynchronous variations in frequency.

* * * * *